US009582574B2

(12) United States Patent
Cardonha et al.

(10) Patent No.: US 9,582,574 B2
(45) Date of Patent: Feb. 28, 2017

(54) GENERATING NAVIGABLE CONTENT OVERVIEWS

(71) Applicant: International Business Machines Corporation, Armonk, NY (US)

(72) Inventors: Carlos H. Cardonha, São Paulo (BR); Ricardo G. Herrmann, São Paulo (BR); Mateus M. Motta, São Paulo (BR); Nicole B. Sultanum, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 14/590,331

(22) Filed: Jan. 6, 2015

(65) Prior Publication Data

US 2016/0196237 A1 Jul. 7, 2016

(51) Int. Cl.
*G06F 17/21* (2006.01)
*G06F 17/30* (2006.01)
*G06F 17/22* (2006.01)
*G06F 17/27* (2006.01)

(52) U.S. Cl.
CPC .... *G06F 17/30722* (2013.01); *G06F 17/2235* (2013.01); *G06F 17/2765* (2013.01)

(58) Field of Classification Search
CPC .............. G06F 17/2715; G06F 17/277; G06F 17/30772; H04L 65/4092; H04L 67/42
USPC ....... 704/9; 707/773; 715/752; 709/203, 217
See application file for complete search history.

(56) References Cited

U.S. PATENT DOCUMENTS

| | | | |
|---|---|---|---|
| 5,510,808 A | 4/1996 | Cina, Jr. et al. | |
| 5,757,370 A | 5/1998 | Amro et al. | |
| 5,859,638 A | 1/1999 | Coleman et al. | |
| 5,896,132 A | 4/1999 | Berstis et al. | |
| 7,328,411 B2 | 2/2008 | Satanek | |
| 7,958,456 B2 | 6/2011 | Ording et al. | |
| 8,412,796 B2 * | 4/2013 | Smyth ................. | G06F 17/3089 709/217 |
| 8,624,933 B2 | 1/2014 | Marr et al. | |
| 8,626,748 B2 | 1/2014 | McDougall | |
| 2007/0101266 A1 | 5/2007 | Kim et al. | |
| 2009/0006358 A1 | 1/2009 | Morris et al. | |
| 2009/0172543 A1 | 7/2009 | Cronin et al. | |

(Continued)

FOREIGN PATENT DOCUMENTS

| | | |
|---|---|---|
| EP | 1947560 A3 | 1/2013 |
| EP | 2606414 A1 | 6/2013 |

(Continued)

OTHER PUBLICATIONS

Lam et al., "Summary Thumbnails: Readable Overviews for Small Screen Web Browsers", CHI 2005, Papers: Small Devices 2, Apr. 2-7, 2005, Portland, Oregon, USA, pp. 681-690, Copyright 2005 ACM 1-58113-998-5/05/0004.

*Primary Examiner* — Charlotte M Baker
(74) *Attorney, Agent, or Firm* — Noah A. Sharkan

(57) ABSTRACT

Embodiments of the present invention provide methods, systems, and computer program products for summarizing, displaying, and navigating content. In one embodiment, text content is parsed to generate representative terms that are linked to portions of the text content to which they correspond. The representative terms can be provided to a user alongside the text content to provide an up-to-date navigable overview of the text content for the user.

20 Claims, 5 Drawing Sheets

(56) References Cited

U.S. PATENT DOCUMENTS

| | | |
|---|---|---|
| 2011/0035380 A1 | 2/2011 | Stafford |
| 2011/0268422 A1 | 11/2011 | Jeong et al. |
| 2012/0144292 A1 | 6/2012 | Lee |
| 2013/0198268 A1* | 8/2013 | Hyman ............... H04L 67/42 709/203 |
| 2014/0019119 A1 | 1/2014 | Liu et al. |
| 2014/0047364 A1 | 2/2014 | Ashbrook et al. |
| 2015/0100894 A1* | 4/2015 | Kumar ............... H04L 12/5825 715/752 |
| 2015/0172240 A1* | 6/2015 | Back ................... H04L 51/10 715/752 |
| 2015/0293900 A1* | 10/2015 | Saadi ............... G06F 17/2715 704/9 |
| 2016/0103875 A1* | 4/2016 | Zupancic ............ G06F 17/27 707/773 |

FOREIGN PATENT DOCUMENTS

| | | |
|---|---|---|
| WO | 2009001278 A1 | 12/2008 |
| WO | 2013085751 A1 | 6/2013 |

\* cited by examiner

GENERATING NAVIGABLE CONTENT OVERVIEWS

BACKGROUND OF THE INVENTION

The present invention relates generally to the field of data processing, and more particularly to generating navigable overviews of text content.

Presently, large amounts of content are constantly being generated and consumed by computer users. Navigating and reviewing such content to find content of interest can require considerable time and resources. Automated summarization technologies may be used to analyze content and generate summaries of content for the benefit of users. In addition, certain visualization technologies, such as word clouds, can be used to assist a user in visualizing content in terms of relative importance.

SUMMARY

Embodiments of the present invention provide methods, systems, and computer program products for summarizing, displaying, and navigating content. According to one embodiment, a method is provided comprising: receiving, by one or more computer processors, text content, wherein at least a portion of the received text content is being displayed in an application window; parsing, by one or more computer processors, the text content to generate a first set of representative terms that are each linked to a portion of the text content; aggregating, by one or more computer processors, the first set of representative terms; and displaying, by one or more computer processors, the aggregated first set of representative terms along with the text content.

DETAILED DESCRIPTION

Embodiments of the present invention recognize that large amounts of text (e.g., Internet web pages, text documents, etc.) can make it difficult for a user to find and navigate to information of interest to the user. Embodiments of the present invention can parse text content, whether structured or unstructured, and generate one or more representative terms that are linked to portions of the text content to which they correspond. The representative terms can be provided to the user alongside the text content, thereby providing both an overview of various portions of the text content, as well as a way to navigate to portions of text content of interest to the user. Furthermore, embodiments of the present can continue to analyze text content as it is updated by a user (e.g., by changing sources of text content, changing views of text content, or editing text content), thereby providing an up-to-date navigable overview of the text content for the user.

Figure 1:
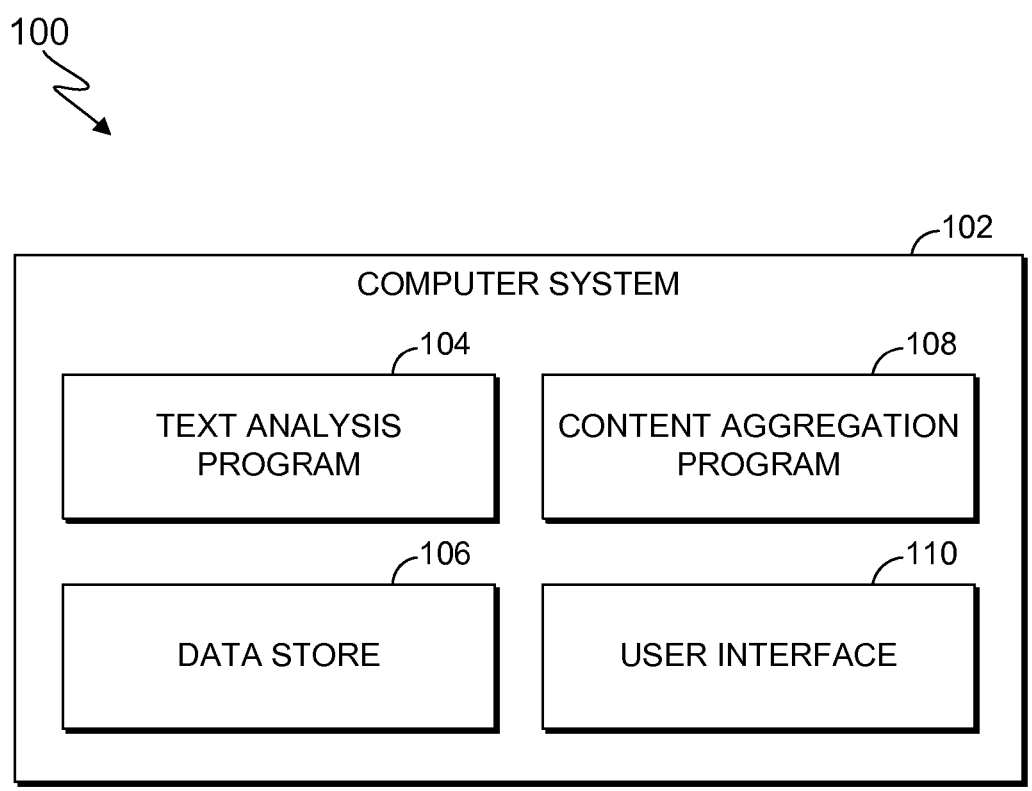
FIG. 1 is a block diagram of a computing environment, in accordance with an embodiment of the present invention.

FIG. 1 is a functional block diagram of a computing environment 100. In this embodiment, computing environment 100 comprises computer system 102. Computer system 102 can be a desktop computer, laptop computer, specialized computer server, or any other computer systems known in the art. In certain embodiments, computer system 102 represents a computer system utilizing clustered computers and components to act as a pool of seamless resources when accessed through a network. In certain embodiments, computer system 102 represents a virtual machine. In general, computer system 102 is representative of any electronic device, or combination of electronic devices, capable of executing machine-readable program instructions, as described in greater detail with regard to FIG. 5.

Computer system 102 includes text analysis program 104, data store 106, content aggregation program 108, and user interface 110. Text analysis program 104 analyzes text content to parse text content and generate one or more representative terms.

Data store 106 is used to store generated representative terms and associated data. Data store 106 can be implemented using any storage architecture known in the art, such as a relational database, an object-oriented database, and/or one or more tables. Similarly, in other embodiments, data store 106 can be hosted remotely and accessed by computer system 102 via a network (e.g., a local area network (LAN), a wide area network (WAN), such as the Internet, or a combination of the two).

Content aggregation program 108 aggregates representative terms such that the terms can be provided to a user in a manner that facilitates easy identification and navigation of portions of text content that are of interest to the user.

User interface 110 displays visual information to a user of computer system 102. In this embodiment, content aggregation program 108 displays aggregated representative terms to a user via user interface 110. As discussed in greater detail later in this specification, content aggregation program 108 and user interface 110 can be used to aggregate and display representative terms to a user in the form of a list, word cloud, or other graphical form, where terms that are determined to be of greater weight are visually distinguished from other terms (e.g., larger, different font, different font color, highlighted, color overlays, etc.). User interface 110 can be implemented as a stand-alone component and/or as an integrated component (e.g., plugin) of other software on computer system 102, such as web browsing software and word processing software.

Figure 2:
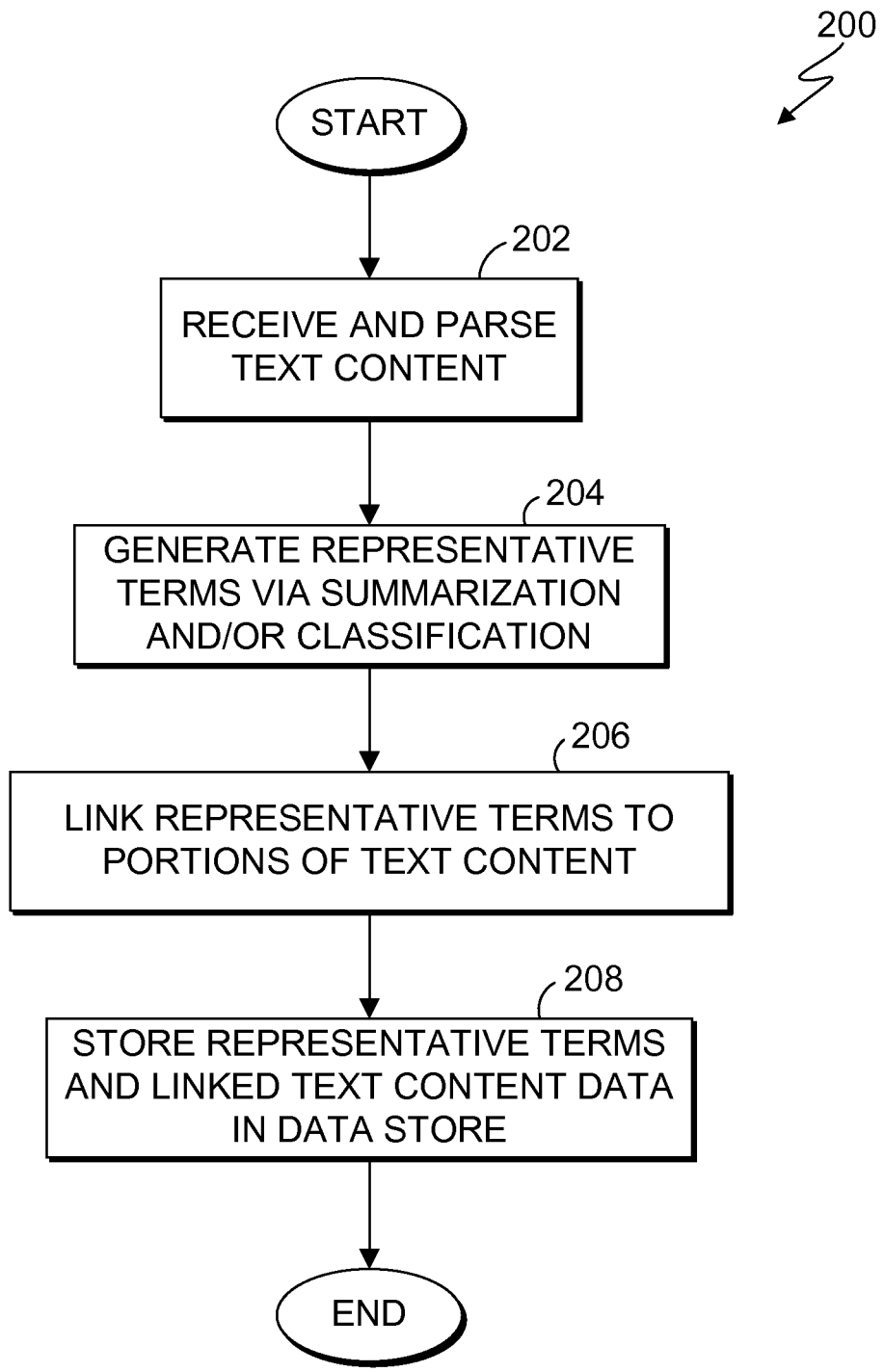
FIG. 2 is a flowchart illustrating operational steps for parsing text content and generating representative terms, in accordance with an embodiment of the present invention.

FIG. 2 is a flowchart 200 illustrating operational steps for analyzing text content to generate one or more representative terms, in accordance with an embodiment of the present invention. In step 202, text analysis program 104 receives and parses text content into words, sentences, and parts of speech in sentences. The text content can be received by text analysis program 104 in various forms, whether structured or unstructured, or alone or in conjunction with graphics and/or other interactive media. For example, text analysis program 104 may detect and parse text content found on a webpage (e.g., news articles, forum posts, search results, etc.) being viewed by a user of computer system 102. In another example, text analysis program 104 may detect and parse text content found in a document being drafted by the user, such as a word processing document or a slide presentation. In both cases, the text content that is parsed need not be limited to text content that is being actually displayed to the user at that time. For example, if a web page contains multiple articles, or a text document contains multiple pages of text, text analysis program 104 can still parse and analyze those portions of text content even though they may not be currently in-view. In this embodiment, text analysis program 104 parses text content using natural language processing (NLP) techniques in conjunction with any schema associated with the text content (e.g., HTML, XML, etc.).

In step 204, text analysis program 104 analyzes parsed text content to generate representative terms via summarization and/or classification techniques. A "representative term", as used herein, refers to a term (e.g., a word or phrase) that is representative of one or more aspects of the text content in which that term is found. For example, text analysis program 104 can analyze parsed text content to generate representative terms for words and phrases identified as having the greatest frequency of use. Text analysis program 104 can also generate representative terms for words and phrases that are determined to represent locations, names, situations, events, time intervals, or other pertinent information. Text analysis program 104 can also generate representative terms that are related to, and/or are synonymous with, terms identified in the parsed text content. In this embodiment, text analysis program 104 can also assign a weight to each representative term that can be used to determine the manner in which representative terms are displayed to a user. For example, based on a user specification, text analysis program 104 can assign greater weight to representative terms that have the greatest frequency of use in a given portion of text content, or to representative terms that appear as a subject or object in the greatest number of sentences. In another example, representative terms can be assigned greater weight based on the age and/or popularity of text content to which they are linked. For example, text analysis program 104 can determine popularity of text content on a web page based on the number of views, hits, or "likes" that text content has received. Similarly, text analysis program 104 can determine age of text content on a web page based on timestamps associated with the text content, and/or text analysis program 104 can determine age of text content in a document based on metadata stored with that document.

In step 206, text analysis program 104 creates links between generated representative terms and the portions of text content to which they correspond (i.e., pointers to associated portions of text content). In this embodiment, such links between representative terms and portions of text content are used to aggregate representative terms and also provide the ability to quickly navigate to portions of text content of interest to the user.

In step 208 text analysis program 104 stores the generated representative terms and the created links in data store 106.

Accordingly, by performing the operational steps of FIG. 2, text analysis program 104 can parse and analyze text content to find representative terms and create links between the representative terms and portions of text content to which they correspond. The operational steps of FIG. 2 can be performed manually (e.g., upon instruction by a user) or automatically (e.g., upon opening the text content, upon changes being made to the text content, etc.). In one embodiment, the operational steps of FIG. 2 are performed each time the text content that is visible to a user via user interface 110 is updated. For example, as the user scrolls down a webpage or navigates to a different webpage, the content being presented to the user changes. In response to such changes, text analysis program 104 can continually parse the text content that is in view to dynamically generate representative terms for content being viewed by the user at that time. However, the generated representative terms displayed for content need not only be those linked to content that is currently in view. Similarly, where the text content is included in a document being drafted by the user, the operational steps of FIG. 2 can be performed each time the user updates a portion of the document (e.g., after each keystroke or sentence) or at a specified interval (e.g., every 5 seconds), such that the representative terms are dynamically updated to reflect the most recent draft. A separate set of representative terms can be generated, aggregated, and displayed for the updated text content as a whole (i.e., updates and original text content), and can replace any previously generated representative terms. In another embodiment, a separate set of representative terms can be generated and aggregated for just the updated portions and can be used to complement any previously generated representative terms. The operational steps of FIG. 2 can also be performed once for all of the text content, regardless of which portions are in view at any given moment.

Figure 3:
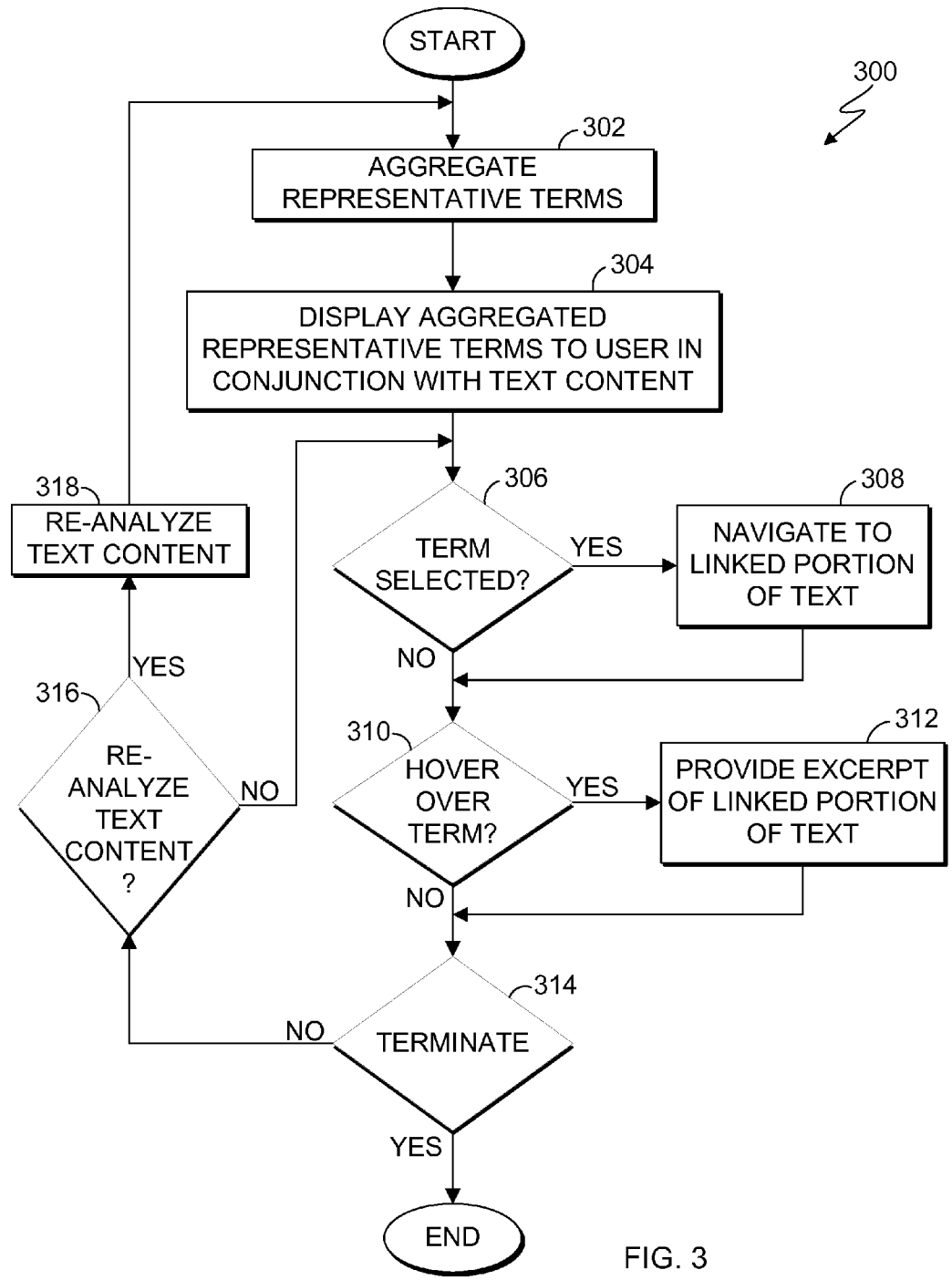
FIG. 3 is a flowchart illustrating operational steps for aggregating representative terms and displaying representative terms to a user, in accordance with an embodiment of the present invention.

FIG. 3 is a flowchart 300 illustrating operational steps for aggregating representative terms and displaying the representative terms to a user in conjunction with text content, in accordance with an embodiment of the present invention.

In step 302, content aggregation program 108 aggregates representative terms. In this embodiment, content aggregation program 108 accesses data store 106 and identifies representative terms generated and stored in data store 106. Representative terms can be aggregated according to various specifications. In one embodiment, representative terms are ordered according to the order of the text content to which they are linked (e.g., representative terms linked to text content that appears earlier in a document are displayed above representative terms linked to text content that appears later in the document), and/or according to their respective weights (e.g., representative terms that are determined to have greater weight are displayed above representative terms that have a lesser weight). Representative terms can also be aggregated in a manner that reflects an underlying structure (e.g., hierarchy) identified in the text content, such as themes, major headings, minor headings, and recurring subjects.

In step 304, user interface 110 displays aggregated representative terms to the user of computing system 102. In this embodiment, the aggregated representative terms are displayed in a navigation panel beside the text content from which the aggregated representative terms were generated. For example, the aggregated representative terms can be displayed in a panel on a top, side, or bottom edge of an Internet browser window, a word processing window, or any other application window containing the text content. However, the aggregated representative terms need not be displayed beside the specific portion of the text content from which they were generated. For example, depending on specified settings for aggregation and the number of aggregated representative terms generated for the text content, not all terms may fit in a navigation panel. Similarly, aggregated representative terms displayed in a navigation panel need not be terms that are linked to portions of text content that are in-view. For example, if only a portion of text content is visible (e.g., the remaining portions would require scrolling), the navigation panel can, nonetheless, display representative terms that have been generated from, and are linked to, portions of the text content that are not currently visible. Accordingly, specified criteria, such as threshold weights and minimum numbers of representative terms per section of text content, can be used to control whether and how certain aggregated representative terms are displayed.

In this embodiment, user interface 110 displays the aggregated representative terms in an interactive manner that facilitates quick identification and navigation to portions of the text content of interest to the user. For example, representative terms can be displayed in a word cloud or nested list in which terms that have a greater weight are visually distinguished from other terms. A user of computer system 102 can scroll through aggregated terms, hover over aggregated terms, and/or select representative terms to perform various functions.

In step 306, user interface 110 determines whether a user has selected a representative term. In this embodiment, a user can select a representative term by clicking or otherwise selecting (e.g., using keystrokes) the representative term in the user interface 110.

If, in step 306, user interface 110 determines that the user has selected a representative term, then, in step 308, user interface 110 navigates to the portion of text content that is linked to the selected term using linking data stored in data store 106. In this embodiment, navigating to the linked portion of text content involves displaying the linked portion of text if it is not already visible to the user, and highlighting the linked portion of text, or otherwise visually distinguishing the linked portion of text content, from the remaining portions of text content. For example, if a first paragraph of text content is currently visible in an application window on user interface 110, and the user selects a representative term that is linked to a fifth paragraph of the text content that is not visible in the window on user interface 110, then user interface 110 can scroll the displayed portion of the text content, such that the fifth paragraph is visible to the user, and user interface 110 can highlight the fifth paragraph.

If, in step 306, user interface 110 determines that the user has not selected a representative term (or after performing step 308), then, in step 310, user interface 110 determines whether the user is hovering over a representative term. In this embodiment, hovering over a representative term can involve the user placing a mouse cursor over the representative term for a specified period of time without clicking the term, or navigating to the representative term using keystrokes (e.g., tab, arrow keys, a specified hotkey, etc.) without selecting the representative term.

If, in step 310, content aggregation program 108 determines that the user is hovering over a representative term, then, in step 312, user interface 110 provides a visual reference to the portion of text to which the representative term is linked. For example, if the user hovers the mouse cursor over a representative term for five seconds, user interface 110 can display a popup window beside the representative term, which can include one or more sentences from the text content that contain, or otherwise pertain to, the representative term, such as an excerpt of the portion of text to which the representative term is linked, or the text of a full paragraph or section to which the representative term is linked. In this manner, the user can quickly determine whether the portion of text content linked to the representative term is of interest without having to first click on the representative term and navigate to the linked text content.

If, in step 310, user interface 110 determines that the user is not hovering over a representative term (or after performing step 312), then, in step 314, user interface 110 determines whether to terminate. In this embodiment, a user of computer system 102 can configure user interface 110 to terminate in response to various conditions, such as an application window displaying the text content being closed. For example, where user interface 110 is displaying aggregated representative terms alongside a browser window, user interface 110 can terminate when the web browser window is closed.

If, in step 314, user interface 110 determines that it should terminate, then the operational steps of FIG. 3 end. If, in step 314, user interface 110 determines that it should not terminate, then, in step 316, user interface 110 determines whether to re-analyze the text content. In this embodiment, user interface 110 can be configured to call text analysis program 104 to re-analyze the text content in response to updates being made to the text content. For example, if user interface 110 determines that a user scrolls an application window to display a new portion of text content, navigates to a different webpage, opens a new text document, or modifies an open text document, user interface 110 can call text analysis program 104 and, in step 318, text analysis program 104 can re-analyze the updated text content in accordance with the operational steps of FIG. 2 to generate additional representative terms. After generating additional representative terms, processing repeats at step 302 to aggregate those terms and update the display of those terms to the user (e.g., replacing the original representative terms or supplementing the original representative terms). In this manner, embodiments of the present invention can provide a dynamic, up-to-date overview and navigational aid to a user as the user is browsing and/or drafting text content. If, in step 316, user interface 110 determines not to re-analyze the text content (e.g., an update to the text content has not been made, or user interface 110 is not configured to trigger such dynamic updates), then processing repeats at step 306, where the user may continue to select and/or hover over displayed representative terms.

Figure 4:
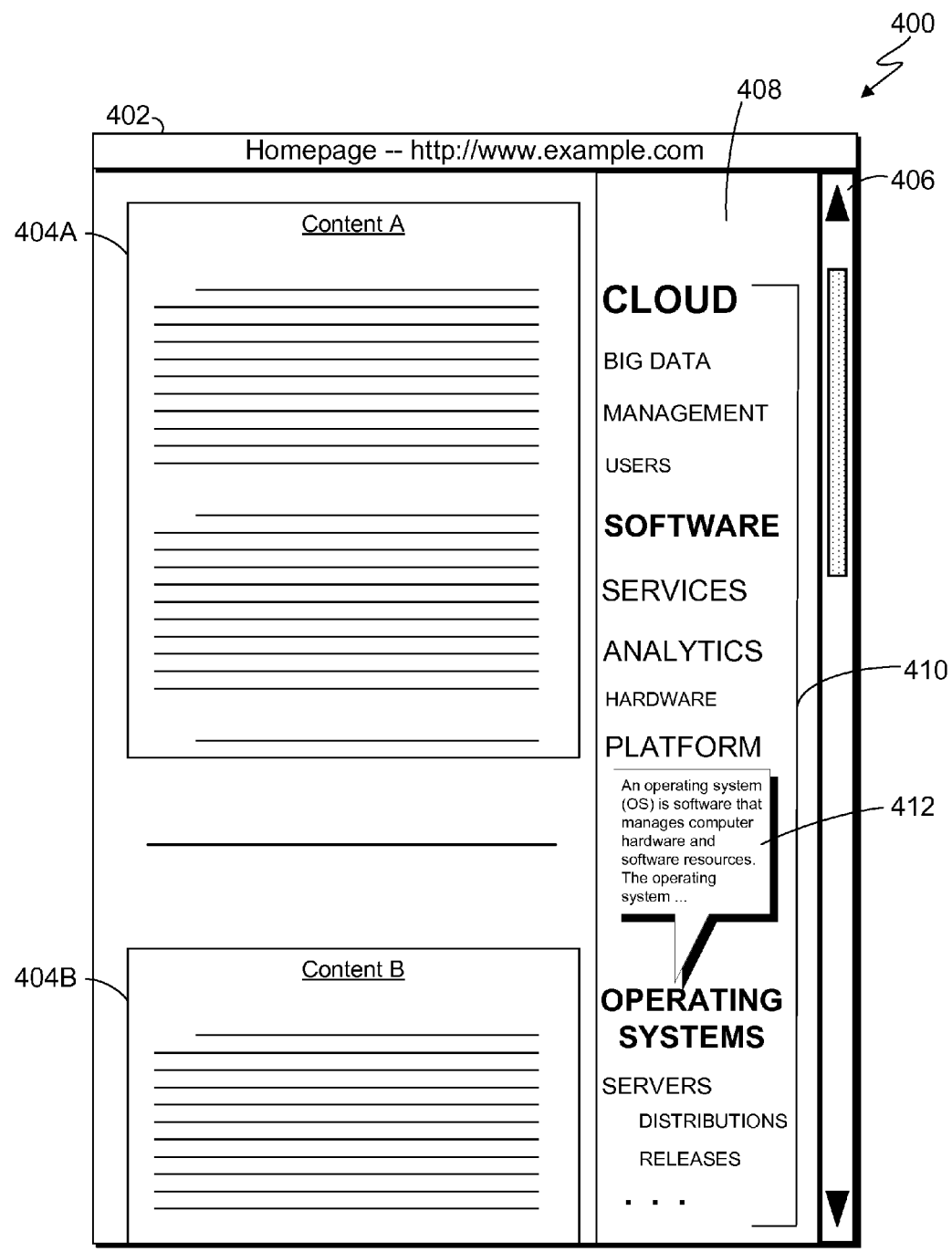
FIG. 4 shows an example user interface, in accordance with an embodiment of the present invention.

FIG. 4 shows an example user interface, in accordance with an embodiment of the present invention. As shown, an Internet browser window 402 is displaying text content 404A and 404B. For example, text content 404A and 404B can be articles, forum posts, search results, or any other type of web content that includes text (alone or in conjunction with graphics and/or other interactive media).

Internet browser window 402 includes a scrollbar 406 that can be used to scroll up and down through webpages causing the content displayed to a user to change. Internet browser window 402 includes a navigation panel 408 (i.e., user interface 110) that displays various representative terms that have been generated by text analysis program 104 from text content 404A and 404B. In this embodiment, content aggregation program 108 has aggregated the representative terms according to their respective weights, as well as the order in which their respective linked portions of content appear in content 404A and 404B. In some instances, navigation panel 408 displays the aggregated representative terms in a manner that visually indicates their relative weight, where bolded terms represent terms having the greatest weight, and terms that have larger font sizes have greater weight than terms that have smaller font sizes. In other embodiments, other techniques can be used to visually distinguish terms having different weights, such as use of different colors, color overlays, fonts, shading, and highlighting. In this example, clicking on any of representative terms 410 in navigation panel 408 will cause scroll bar 406 to be scrolled an amount necessary to display to the user the portion of text content 404A and/or 404B that is linked to the clicked representative term.

In other instances, as shown, navigation panel 408 displays aggregated representative terms in a manner that also visually indicates a hierarchy of portions of content 404B. In this example, content 404B pertains to operating systems and includes portions of text content linked to representative terms "OPERATING SYSTEMS", "SERVERS", "DISTRIBUTIONS", and "RELEASES". Navigation panel 408 displays the representative term "OPERATING SYSTEMS" in a larger, bolded font, which is indicative of a primary theme or subject of content 404B. The representative term "SERVERS" is displayed in a smaller, non-bolded font, followed by a nested list of the representative terms "DISTRIBUTIONS" and "RELEASES", which indicate a hierarchical structure of content 404B (i.e., headings and subheadings).

In this example, a popup window 412 is displayed in response to a user hovering a cursor over the representative term "OPERATING SYSTEMS". As shown, popup window 412 is populated with an excerpt of a portion of text content that is linked to the representative term "OPERATING SYSTEMS". Accordingly, popup window 412 provides the user with a quick way to review portions of text content associated with the representative term without having to navigate to those portions of text content, such as by manually scrolling using scroll bar 406, or by clicking on the representative term, as discussed above.

Figure 5:
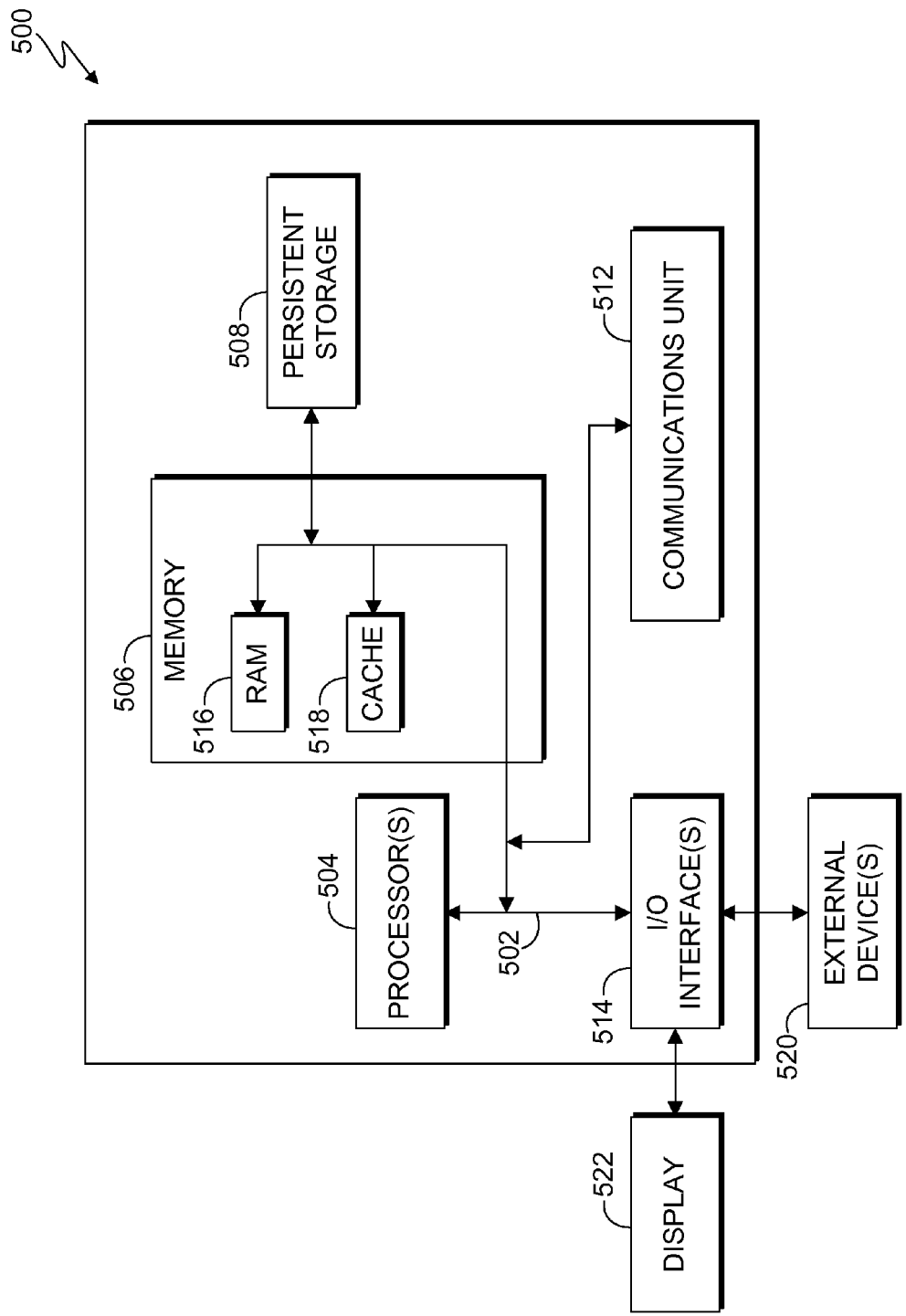
FIG. 5 is a block diagram of internal and external components of the computer system of FIG. 1, in accordance with an embodiment of the present invention.

FIG. 5 is a block diagram of internal and external components of a computer system 500, which is representative of the computer systems of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media. Software (e.g., text analysis program 104, content aggregation program 108, etc.) is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network. In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520 such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for summarizing, displaying, and navigating content, comprising:
  receiving, by one or more computer processors, text content, wherein at least a portion of the received text content is being displayed in an application window;
  parsing, by one or more computer processors, the text content to generate a first set of representative terms that are each linked to a portion of the text content, wherein each representative term is a term that is found in the portion of the text content to which that representative term is linked;
  aggregating, by one or more computer processors, the first set of representative terms; and
  displaying, by one or more computer processors, the aggregated first set of representative terms along with the text content, wherein each displayed representative term is selectable to navigate to and display in the application window the portion of text content to which that representative term is linked.

2. The method of claim 1, further comprising:
responsive to detecting an update to the text content, generating, by one or more computer processors, a second set of representative terms that are each linked to a portion of the updated text content, and displaying, by one or more computer processors, the second set of representative terms along with the updated text content.

3. The method of claim 2, wherein the second set of representative terms replace the first set of representative terms.

4. The method of claim 1, wherein the first set of representative terms is generated using one or both of summarization and classification techniques, and each representative term is assigned a weight based on at least one of: frequency of use in the text content, frequency of use as a subject or object in sentences of the text content, age of the text content to which the representative term is linked, or a number of views of the text content to which the representative term is link.

5. The method of claim 1, wherein the first set of representative terms is displayed according to an order in which the linked portions of text content appear in the text content.

6. The method of claim 4, wherein displaying, by one or more computer processors, the aggregated first set of representative terms along with the text content comprises:
displaying a navigational panel in which representative terms are visually distinguished according to their assigned weights, wherein the navigational panel is positioned beside the application window.

7. The method of claim 1, wherein displaying, by one or more computer processors, the aggregated first set of representative terms along with the text content comprises:
displaying the aggregated first set of representative terms in a manner that indicates a hierarchical structure of the portions of text content to which the representative terms of the aggregated first set of representative terms are linked, wherein representative terms that are identified as being linked to headings in the received text content are visually distinguished from representative terms that are identified as being linked to subheadings in the received text content.

8. The method of claim 1, further comprising:
responsive to receiving a selection of a first representative term, navigating, by one or more compute processors, to the portion of text content to which the first representative term is linked in the application window, and visually distinguishing the portion of text content to which the first representative term is linked.

9. The method of claim 1, further comprising:
responsive to a user hovering a mouse cursor over a first representative term, displaying, by one or more computer processors, a visual reference to a portion of text content to which the first representative term is linked.

10. A computer program product for summarizing, displaying, and navigating content, comprising:
one or more computer readable storage media and program instructions stored on the one or more computer readable storage media, the program instructions comprising:
program instructions to receive text content, wherein at least a portion of the received text content is being displayed in an application window;
program instructions to parse the text content to generate a first set of representative terms that are each linked to a portion of the text content, wherein each representative term is a term that is found in the portion of the text content to which that representative term is linked;
program instructions to aggregate the first set of representative terms; and
program instructions to display the aggregated first set of representative terms along with the text content, wherein each displayed representative term is selectable to navigate to and display in the application window the portion of text content to which that representative term is linked.

11. The computer program product of claim 10, wherein the program instructions stored on the one or more computer readable storage media further comprise:
program instructions to, responsive to detecting an update to the text content, generate a second set of representative terms that are each linked to a portion of the updated text content, and display the second set of representative terms along with the updated text content.

12. The computer program product of claim 10, wherein the first set of representative terms is generated using one or both of summarization and classification techniques, and each representative term is assigned a weight based on at least one of: frequency of use in the text content, frequency of use as a subject or object in sentences of the text content, age of the text content to which the representative term is linked, or a number of views of the text content to which the representative term is link.

13. The computer program product of claim 10, wherein the first set of representative terms is displayed according to an order in which the linked portions of text content appear in the text content.

14. The computer program product of claim 12, wherein the program instructions to display the aggregated first set of representative terms along with the text content comprise:
program instructions to display a navigational panel in which representative terms are visually distinguished according to their assigned weights, wherein the navigational panel is positioned beside the application window.

15. The computer program product of claim 10, wherein the program instructions to display the aggregated first set of representative terms along with the text content comprise:
program instructions to display the aggregated first set of representative terms in a manner that indicates a hierarchical structure of the portions of text content to which the representative terms of the aggregated first set of representative terms are linked, wherein representative terms that are identified as being linked to headings in the received text content are visually distinguished from representative terms that are identified as being linked to subheadings in the received text content.

16. The computer program product of claim 10, wherein the program instructions stored on the one or more computer readable storage media further comprise:
program instructions to, responsive to receiving a selection of a first representative term, navigate to the portion of text content to which the first representative term is linked in the application window, and visually distinguish the portion of text content to which the first representative term is linked; and program instructions to, responsive to a user hovering a mouse cursor over a first representative term, display a visual reference to a portion of text content to which the first representative term is linked.

17. A system for summarizing, displaying, and navigating content, comprising:
   one or more computer processors;
   one or more computer readable storage media; and
   program instructions stored on the one or more computer readable storage media for execution by at least one of the one or more processors, the program instructions comprising:
   program instructions to receive text content, wherein at least a portion of the received text content is being displayed in an application window;
   program instructions to parse the text content to generate a first set of representative terms that are each linked to a portion of the text content, wherein each representative term is a term that is found in the portion of the text content to which that representative term is linked;
   program instructions to aggregate the first set of representative terms; and
   program instructions to display the aggregated first set of representative terms along with the text content, wherein each displayed representative term is selectable to navigate to and display in the application window the portion of text content to which that representative term is linked.

18. The system of claim 17, wherein the program instructions stored on the one or more computer readable storage media further comprise:
   program instructions to, responsive to detecting an update to the text content, generate a second set of representative terms that are each linked to a portion of the updated text content, and display the second set of representative terms along with the updated text content.

19. The system of claim 17, wherein the program instructions to display the aggregated first set of representative terms along with the text content comprise:
   program instructions to display a navigational panel in which representative terms are visually distinguished according to an assigned weight, wherein the assigned weight for each representative term is based on at least one of: frequency of use in the text content, frequency of use as a subject or object in sentences of the text content, age of the text content to which the representative term is linked, or a number of views of the text content to which the representative term is link.

20. The system of claim 19, wherein the program instructions stored on the one or more computer readable storage media further comprise:
   program instructions to, responsive to receiving a selection of a first representative term, navigate to the portion of text content to which the first representative term is linked in the application window, and visually distinguish the portion of text content to which the first representative term is linked; and
   program instructions to, responsive to a user hovering a mouse cursor over a first representative term, display a visual reference to a portion of text content to which the first representative term is linked.

* * * * *